Patented Nov. 23, 1948

2,454,700

UNITED STATES PATENT OFFICE 2,454,700

DUPLICATING INKS

Melville J. Holik, Berwyn, Ill., assignor to Ditto, Incorporated, Chicago, Ill., a corporation of West Virginia No Drawing. Application April 15, 1946, Serial No. 662,400

3 Claims. (Cl. 106—22)

The invention relates to an improvement in duplicating inks, and more particularly to an improved black copying ink particularly adapted for spirit process duplication.

Hitherto attempts have been made to combine various color dyes to obtain a black suitable for spirit process duplication. It is relatively easy to make a black dye by mixing various combinations of red, orange, green and violet, but after a few black copies have been made by the spirit process it is found that the succeeding copies begin to show the color of one of the dyes, and the copies are no longer black but are of a greenish or purple gray, or some other off gray. Furthermore, many of the dye combinations which produce a black are thixotropic when mixed with oil-wax for coating on sheets to produce so-called hectograph carbon papers.

An object of this invention is to provide a duplicating ink or composition which gives a jet black for a large number of copies such as a hundred or more.

Another object is to provide a black ink composition particularly suitable for hectograph carbon papers.

In accordance with this invention, to obtain the black prints or copies above referred to, I use as the soluble coloring material of my composition a mixture of spirit or ethyl alcohol soluble purple, orange, green, red and brown dyes in such proportions as to give a black. The brown in this combination is of particular importance in obtaining long runs of black copies. Preferably each dye is one that has a color intensity of at least 75% of the strongest dye of the given color. With dyes of such color intensities I may use 6 to 8, inclusive, parts by weight of purple dye, 12 to 17, inclusive, parts by weight of orange dye, 10 to 15, inclusive, parts by weight of green dye, 6 to 9, inclusive, parts by weight of red dye, and 9 to 13, inclusive, parts by weight of brown dye. Suitable purple dyes include crystal violet, methyl violet and ethyl violet. Suitable orange dyes include chrysoidine, basic or acridine orange (Zn double chloride of tetramethyl diamino acridine), and croceine orange (Na salt of benzene-azo-B naphthol-6-sulfonic acid). Suitable green dyes include brilliant green and malachite (or Victoria) green. Suitable red dyes include rhodamine, magenta and safranin. Suitable brown dyes include basic brown and bismarck brown (hydrochloride of toluene-2,4-diazo-bis-m-toluylenediamine).

My preferred dye combination is as follows:

| Color | Dye | Parts by weight Preferred | Range |
|---|---|---|---|
| purple | crystal violet (hydrochloride of hexamethyl pararosaniline). | 7 | 6-8 |
| orange | chrysoidine (hydrochloride of benzene azo-m-phenylenediamine, also hydrochloride of benzene azo-m-toluyl-diamine). | 15 | 12-17 |
| green | brilliant green (salt of tetraethyl di-amidotriphenyl carbinol). | 13 | 10-15 |
| red | rhodamine (tetraethyldiamino - ortho-carboxy-phenyl-xanthenyl chloride). | 6.7 | 6-9 |
| brown | basic brown (hydrochloride of benzene-m-diazo-bis-m-phenylene-diamine). | 13 | 9-13 |
|  |  | 54.7 |  |

The foregoing formula or composition of dyes is used as the coloring agent in my improved duplicating inks to produce black copies, although the medium or vehicle for the dyes will vary to fit different adaptations or conditions for use.

To make my ink composition in the form of coating material for hectograph type carbon paper, I mix said dye composition with a suitable quantity of an appropriate medium, one example of which is as follows:

| Ingredient | Parts by weight |
|---|---|
| Beeswax | 3.0 |
| Mineral oil | 25.0 |
| Carnauba wax | 10.0 |
| Tacky mineral oil foots | 7.3 |
|  | 45.3 |

It is contemplated that oily and waxy substances other than those above specified may be used, and that the proportions also may be varied. Preferably, however, I avoid the use of vegetable oils since such oils tend to produce thickening or gelling of the coating composition, especially in hot, humid weather. Lard oil, tallow and oleic acid may be used to produce a carbon paper coating composition, but I prefer not to use these materials as they tend to give poor aging resistance. In general, however, any oil and wax medium may be used with my dye composition, it being general practice, however, to have an oil and wax medium containing dyestuff having a melting point below the temperature which will cause decomposition of the dyestuff.

The ingredients may be mixed and coated on the transfer sheet in various ways. The dies may be added to the molten oil-wax composition and the mixture thoroughly ground to intimately disperse the dyes therein and form a soluble black color. The molten black ink composition may then be flowed on to a sheet of paper, whereupon on cooling there is formed a so-called hectograph carbon paper. This carbon paper, as is well known in the art, is then used to make master sheets from which black copies are made by moistening the master sheet with alcohol or like solvent and contacting the master sheet with copy paper.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A duplicating ink comprising a mixture of dyes in proportionate amounts in parts by weight as follows: crystal violet 6 to 8, chrysoidine 12 to 17, brilliant green 10 to 15, rhodamine 6 to 9, basic brown 9 to 13.

2. A duplicating ink comprising a mixture of dyes in proportionate amounts in parts by weight as follows: crystal violet 6 to 8, chrysoidine 12 to 17, brilliant green 10 to 15, rhodamine 6 to 9, basic brown 9 to 13, and an oil and wax medium in which said dyes are dispersed in a finely divided condition.

3. An ink composition consisting essentially of ingredients in approximate proportions by weight as follows: crystal violet 7, chrysoidine 15, brilliant green 13, rhodamine 6.7, basic brown 13, beeswax 3, mineral oil 25, carnauba wax 10, tacky mineral oil foots 7.3.

MELVILLE J. HOLIK.

REFERENCES CITED

The following references are of record in the file of this patent:

UNITED STATES PATENTS

| Number | Name | Date |
|---|---|---|
| 188,212 | Linder et al. | Mar. 6, 1877 |
| 1,198,440 | Hochstetter | Sept. 19, 1916 |
| 1,393,142 | Kruse | Oct. 11, 1921 |
| 1,843,661 | Cooney | Feb. 2, 1932 |
| 2,238,275 | Martone | Apr. 15, 1941 |
| 2,357,948 | Gessler | Sept. 12, 1944 |

FOREIGN PATENTS

| Number | Country | Date |
|---|---|---|
| 279,403 | Great Britain | Mar. 29, 1928 |

OTHER REFERENCES

Lehner Ink Manufacturer (1926), pages 89 to 92.

"Chemical Formulary," Bennett (1939), vol. IV, pages 146 and 147.